A. AND M. BERSTED.
PHONOGRAPH BALANCE WEIGHT COVER SUPPORT.
APPLICATION FILED FEB. 5, 1921.
1,413,382.
Patented Apr. 18, 1922.
2 SHEETS—SHEET 1.
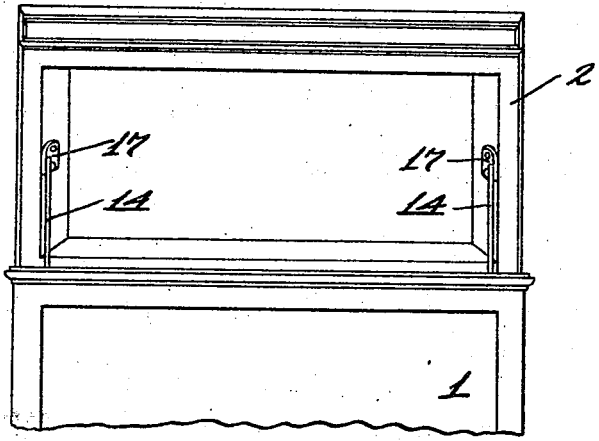
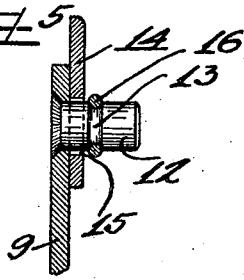
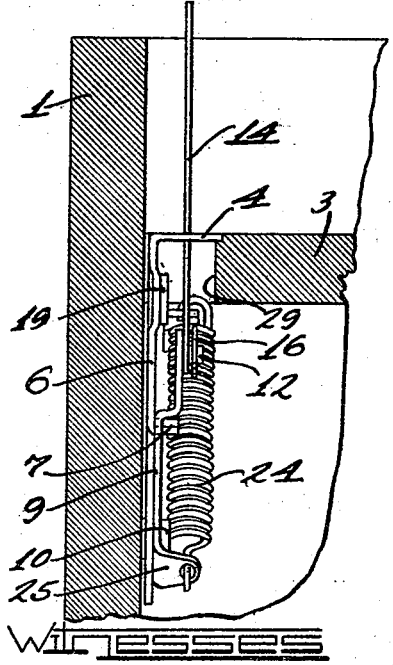
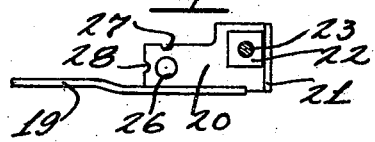
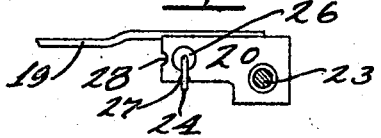
Inventor
Alfred Bersted
Martin Bersted

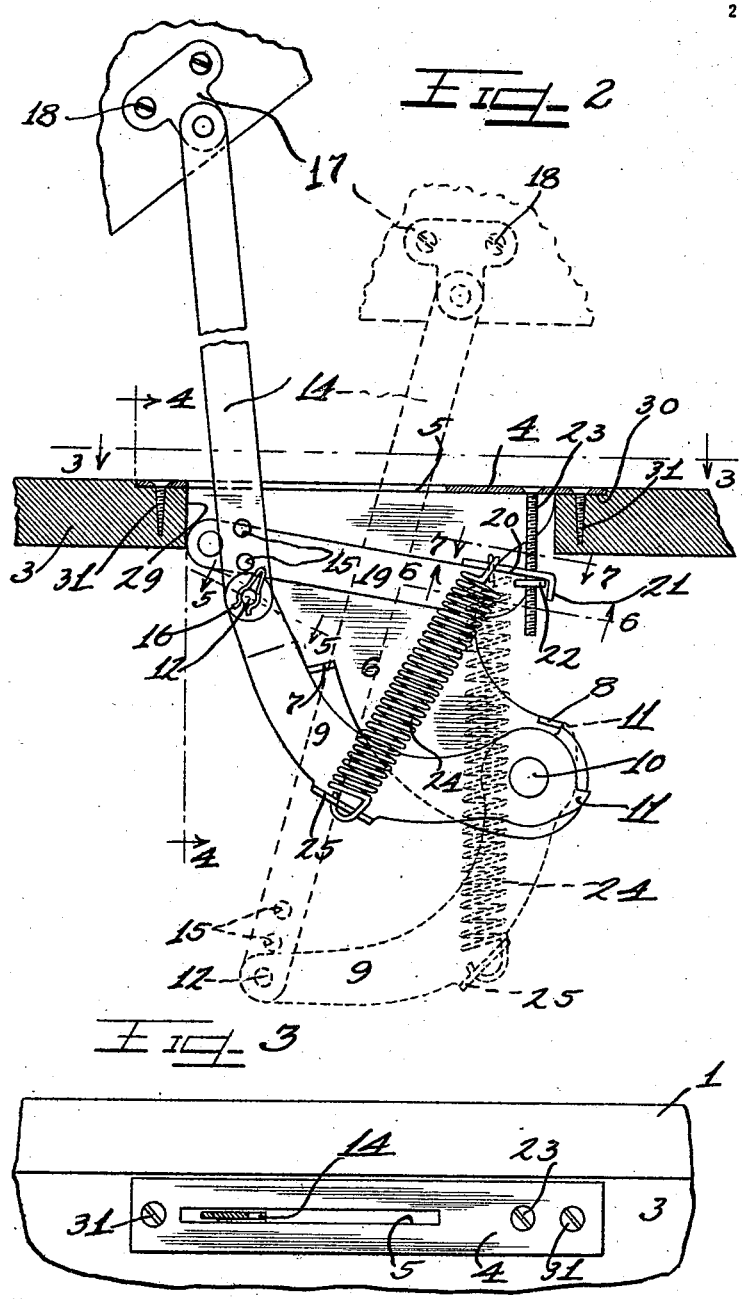

UNITED STATES PATENT OFFICE.

ALFRED BERSTED AND MARTIN BERSTED, OF CHICAGO, ILLINOIS.

PHONOGRAPH BALANCE-WEIGHT-COVER SUPPORT.

1,413,382.

Specification of Letters Patent. Patented Apr. 18, 1922.

Application filed February 5, 1921. Serial No. 442,692.

*To all whom it may concern:*

Be it known that we, ALFRED BERSTED and MARTIN BERSTED, both citizens of the United States, and residents of the city of Chicago, in the county of Cook and State of Illinois, have invented certain new and useful Improvements in a Phonograph Balance-Weight-Cover Support; and we do hereby declare that the following is a full, clear, and exact description of the same, reference being had to the accompanying drawings, and to the numerals of reference marked thereon, which form a part of this specification.

This invention relates more particularly to an improved supporting mechanism adapted primarily for use on a phonograph cabinet for the purpose of holding the cover balanced in any desired position of adjustment.

Phonograph cover supports have heretofore been secured to the side walls of the phonograph cabinet and objections have arisen to such constructions because of the difficulty in properly supporting them on the walls which are generally made of comparatively thin material and because of the difficulties encountered in the assembly and adjustment of these supports. Among other advantages this contemplates the overcoming of these difficulties by mounting the cover supports on the motor board in such a manner that they are conveniently adjustable from the front of the phonograph.

It is an object of this invention to provide a balance weight cover support for a phonograph cover to permit the cover to be held in any one of a plurality of open balanced positions against its own weight.

It is also an object of the invention to construct an adjustable spring controlled mechanism for use on one or two sides of a phonograph cover to act as a means for balancing said cover in a predetermined position of adjustment.

Another object of this invention is the construction of a casing cover support wherein spring controlled toggle mechanisms are provided for balancing the cover in any open position of adjustment.

A further object of this invention is the construction of a balance mechanism for holding a casing cover balanced in open position and wherein an actuating spring approaches a dead center position but does not pass the same when the cover reaches its closed position.

It is furthermore an object of the invention to construct a phonograph cover support adapted to be readily mounted in position supported by the motor board and affording easy access to an adjusting screw for regulating the tension of a control spring without requiring removal of any parts or mechanism from the machine.

It is an important object of this invention to provide a supporting mechanism of simple and effective construction adapted for use on a phonograph cabinet cover, said mechanism being controlled by a spring which does ordinarily not pass dead center when the cover is completely closed.

Other and further important objects of this invention will be apparent from the disclosures in the drawings and specification.

The invention (in a preferred form) is illustrated in the drawings and hereinafter more fully described.

On the drawings:

Figure 1 is a front elevation of the upper portion of a phonograph cabinet the cover of which is held balanced in an adjusted open position by cover supports embodying the principles of this invention.

Figure 2 is an enlarged side elevation of the device showing the operation in dotted lines and further disclosing fragmentary parts of the phonograph cabinet and its cover, the right side of the drawing indicating the front of the phonograph.

Figure 3 is a sectional top plan view taken on line 3—3 of Figure 2.

Figure 4 is a sectional view taken on line 4—4 of Figure 2.

Figure 5 is an enlarged fragmentary detil section taken on line 5—5 of Figure 2 showing the pin in elevation.

Figure 6 is a detail view taken on line 6—6 of Figure 2.

Figure 7 is a detail view taken on line 7—7 of Figure 2.

As shown on the drawings:

The reference numeral 1 indicates a phonograph cabinet or a casing having a cover 2 hingedly connected to the upper margin of the rear wall thereof. Mounted in the upper portion of the cabinet 1 is a horizontal motor board 3 secured to or supported by the upright walls of the cabinet.

To prevent warping of the cover as frequently occurs in cabinets where only one side of the cover is supported by a stay bar, the cover of the cabinet illustrated is provided with two oppositely disposed supporting devices connected to both sides of the cover.

Each supporting device comprises a top plate or mounting flange 4 provided with screw apertures and with a longitudinal slot 5. Integrally formed at right angles to one side margin of the top plate 4 is a side or mounting plate 6 having integrally formed thereon stop lugs 7 for limiting the upward movement of a curved lever or arm 9. One end of the curved arm 9 is pivotally mounted on the lower rear portion of the plate 6 by means of a pivot pin 10. Integrally formed on the pivoted end of the arm 9 is a tooth or projection 11 adapted to contact the stop lug 8, as shown in dotted lines in Figure 2. This arrangement makes possible the limiting of the movement of the arm 9 when the device is removed from a phonograph, as for example during shipment. The upper or free end of the arm 9 is adapted to contact the stop 7 to limit the upward movement of said arm.

Rigidly secured to the outer end of the arm 9 is a pin 12 provided with a peripheral groove 13. Pivotally engaged on the pin 12 is the lower or inner end of a stay bar 14. The stay bar has a plurality of apertures 15 provided in the inner end thereof to permit adjustment of the length of said stay bar. To prevent the stay bar from sliding off the pin 12 a hair pin clip 16 is removably engaged in the groove 13 of said pin 12.

The stay bar 14 projects through the flange slot 5 and has pivotally secured on the outer end thereof an apertured attaching plate 17 which is adapted to be secured to the inner surface of one of the cover sides by screws or other suitable means 18, as illustrated in Figures 1 and 2.

Pivotally mounted near the upper front portion of the inner surface of the mounting plate 6 is one end of a spring tensioning bar or arm 19, the other or rear end of which has integrally formed at right angles on the upper margin thereof a flange projection 20, the rear end of which extends beyond the end of the arm 19 and is bent downwardly at right angles to afford a stop flange 21 for a nut 22 of an adjusting screw 23. The adjusting screw projects through one of the apertures of the mounting flange 4 and through an opening provided in the flange projection 20. The adjusting screw 23 is threaded through the nut 22 which is disposed below the flange projection 20 and is prevented from turning by the stop flange 21. The screw 23 when turned is adapted to raise or lower the arm 19 for the purpose of adjusting the tension of a coiled control spring 24. The lower end of the spring 24 is hooked through an aperture of a lug 25 integrally formed at right angles on the lower margin of the swinging arm 9 between the pivot pin 10 and the pin 12. The other or upper end of the spring 24 is hooked to engage through an opening 26 in the flange projection 20. Notches 27 and 28 are respectively provided in the side and end of the flange projection 20, as illustrated in Figures 6 and 7, to permit the upper hooked end of the coiled spring 24 to be seated in either of said notches.

The operation is as follows:

As illustrated in Figure 1, the phonograph cabinet is equipped with two balance weight cover supports which are connected to the opposite sides of the phonograph cover 2 to obviate any tendency of warping of the cover which often occurs in cases where only one side of a cabinet cover is supported.

Each side of the cabinet motor board 3 is provided with a slot or opening 29. Attention is specfically directed to the fact that in mounting the cover supports in place it is not necessary to remove the cabinet motor plate from the phonograph cabinet.

To mount a cover support in place the plate 6 is projected downwardly through a board slot 29 and the supporting flange 4 is seated in a recess 30 of the motor board 3 to close the slot 29. Screws 31 are used to secure the flange 4 in place with the upper surface thereof flush with the top surface of the board 3. The attaching plate 17 is secured on the inner surface of a side wall of the cover 2 by screws 18 or other suitable means.

By referring to Figures 2 and 3 it will be noticed that the head of the adjusting screw is readily accessible from the top of the flange plate 4 so that with the use of a screw driver the screw 23 may be turned to cause either raising or lowering of the arm 19. The tension of the spring 24 may thus be adjusted by operating the screw 23. The nut 22 prevents disengagement of the flange plate 20 from the screw 23, and said nut is held against rotation by means of the flange stop 21. The tension of the spring 24 is adjusted to a degree whereby the cover 2 is balanced in any position of adjustment.

When the cover is in closed position as indicated in dotted lines in Figure 2, the stay bar 14 as well as the spring 24 are both vertically positioned. The upward movement of the cover 2 is limited by the stop 7 against which the arm 9 in its upward movement is adapted to contact.

Attention is directed to the fact that as the cover 2 is lowered the spring 24 approaches a dead center position or the pivot pin 10 but is not permitted to pass the dead center point for the reason that the contact of the lid with the phonograph cabinet limits this movement. This arrangement is very desirable for the reason that the cover, when approaching its closed position, is not permitted to close with a snap which would occur if the spring 24 were permitted to pass dead center. The fingers of a person closing the cover are therefore not in danger of being pinched between the cover and the cabinet, which very frequently is the case in constructions wherein the springs are permitted to pass a dead center position. This result is not attained when a single spring and balance support is employed.

As already described both sides of the cover 2 are connected with balance supports thereby equally sustaining both sides of the cover to prevent any tendency of the cover to twist or warp out of shape as is the case when only one side of a cover is supported.

With the tension of the springs 24 set to balance the weight of the cover 2, the cover may be opened to any desired position of adjustment.

The length of the stay bar 14 may be changed by simply removing the hair pin clip 16 from the groove 13 of the pin 12. When this is done the apertured end of the stay bar may be removed from the pin 12. The stay bar may again be engaged on the pin 12 but with the pin 12 engaged in a different one of the bar apertures 15.

We are aware that various details of construction may be varied through a wide range without departing from the principles of this invention, and we therefore do not purpose limiting the patent granted otherwise than necessitated by the prior art.

We claim as our invention:

1. The combination with a phonograph cabinet top or motor board and a phonograph cover, of balance supporting means supported by the top or motor board and connected with the cover, and means for adjusting said balance supporting means from the top of the top or motor board.

2. The combination with a phonograph cabinet and the slotted top or motor board and cover thereof, of a balance device for the cover comprising a mounting plate adapted to be projected through said slotted board, a supporting flange integrally formed on said plate and secured to said board to close the slot therein, said supporting flange having a slot therein, a stay bar projecting through said slot and pivotally connected to said cover, an arm pivotally supported on said plate, a grooved pin thereon for receiving the inner end of said stay bar, a hair pin clip engaged in the groove of said pin to hold the stay bar in place on said pin, a member pivotally mounted on said plate, a spring connecting said arm and member, stops on said plate for limiting the swing of said arm, and an adjusting screw projecting through said flange adapted to be operated from the top of the board to cause adjustment of said member and tensioning of said spring.

3. The combination with a horizontal casing board having a slot therein, of a cover hingedly supported above said board, a flange plate for closing said slot, a mounting plate formed on said flange plate and projecting downwardly through said slot, stops formed on said mounting plate, an arm pivoted on said mounting plate adapted to be limited in its movement by said stops, a stay bar pivotally connected to said arm and projecting upwardly through said flange plate slot, an attaching plate pivotally connected to the upper end of said stay bar and secured to said cover, a member pivotally mounted on said mounting plate, an apertured flange thereon, a coiled spring connected to said arm and to said apertured flange, a stop formed on said apertured flange, a nut disposed below said apertured flange adapted to be held against rotation by said stop, and a screw projecting downwardly through said flange plate and through said apertured flange and threaded through said nut, said screw adapted to be adjusted from the top of said flange plate to cause movement of said member and adjustment of said spring.

4. In a phonograph cabinet, a cover, a horizontal board having a slot therein, a stay extending through said slot and attached to the cover, a spring mechanism below said board acting through said stay to balance the cover, and means for adjusting the tension of said spring mechanism, said means including a control member extending to the upper side of said board whereby the adjustment may be made from above said board.

5. A balance weight cover support comprising a plate, a slotted flange integrally formed thereon for mounting the plate, two arms pivotally mounted on said plate, a spring connecting said arms, a cover supporting stay bar pivotally mounted on one of said arms and projecting through said slotted flange, and an adjusting screw connected with the other arms adapted to be adjusted from the top of the flange to actuate said last mentioned arm to cause adjustment of said spring.

In testimony whereof we have hereunto subscribed our names in the presence of two subscribing witnesses.

ALFRED BERSTED.
MARTIN BERSTED.

Witnesses:
CARLTON HILL,
JAMES M. O'BRIEN.